O. C. REEVES.
MACHINE FOR CUTTING AGATES AND SIMILAR STONES.
APPLICATION FILED OCT. 13, 1917.

1,342,647.

Patented June 8, 1920.
5 SHEETS—SHEET 1.

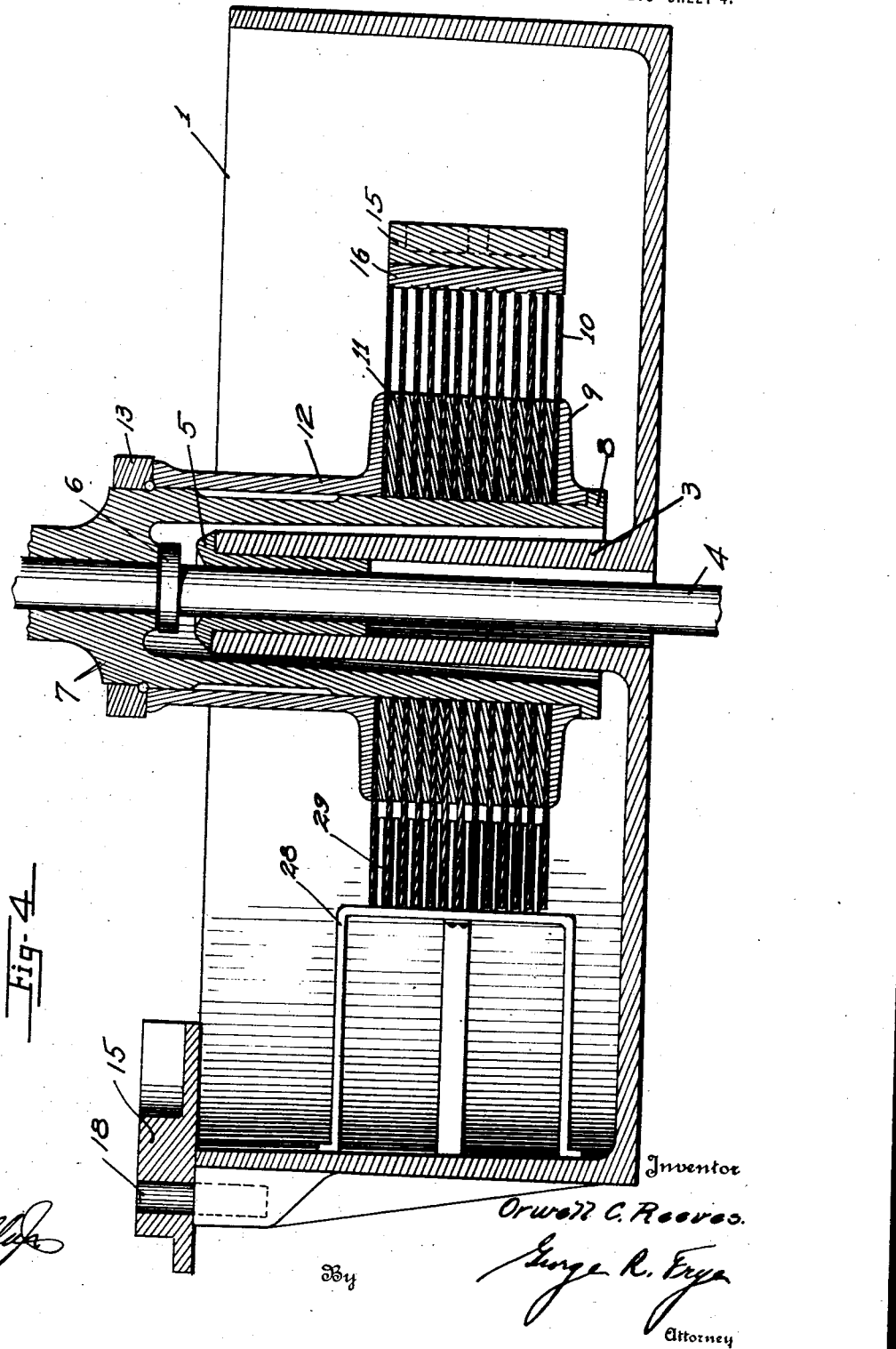

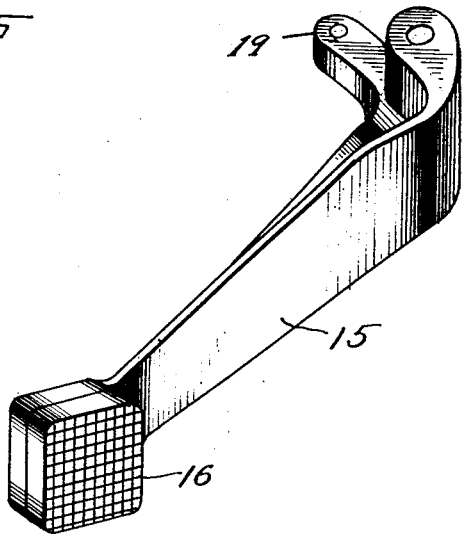
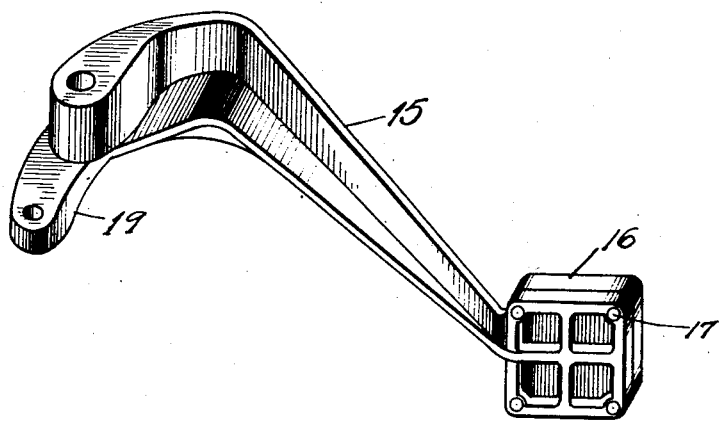

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

MACHINE FOR CUTTING AGATES AND SIMILAR STONES.

1,342,647.   Specification of Letters Patent.   Patented June 8, 1920.

Application filed October 13, 1917. Serial No. 196,428.

*To all whom it may concern:*

Be it known that I, ORWELL C. REEVES, a citizen of the United States, residing at Toledo, in the county of Lucas and State of Ohio, have invented certain new and useful Improvements in Machines for Cutting Agates and Similar Stones, of which the following is a specification.

This invention relates to machines for cutting material of comparative hardness, and more particularly to machines for the cutting of precious and semi-precious stones.

In certain of the mechanical arts, such as those relating to the development of the scale, horological and scientific instrument industries, it has been found necessary to use pivots, bearings and the like of very hard material, such as agate and other precious or semi-precious stones. Heretofore it has been the custom to import such agate bearings, etc., in great quantities from foreign countries, where the labor employed in cutting these stones by successive hand operations did not greatly affect the cost thereof. The difficulty experienced in providing a machine for cutting hard stones, such as agate, bears mainly on the coöperation of suitable cutting members adapted to cleave the stone in straight lines and over a sufficient area to allow the production of the agate bearings and pivots in considerable quantities.

The present invention provides an agate cutting machine adapted to simultaneously cut a number of jewel bearings of predetermined sizes and dimensions from blocks of agate or similar hard stones of irregular contour. Means are also provided for varying at will the number of jewel bearings to be so cut, both by varying the number of cutting blades employed and by varying the number of blocks of agate arranged to coöperate with the cutting blades.

Another object of my invention is to provide adjustable means for automatically regulating the depth of cut in any or all of the blocks of agates engaged.

A further object of my invention is to provide means for cutting blocks of agates in two or more directions with the same cutting blades and holding members, the arrangement being such that the position of the agate block relative to the cutting blades may be altered whenever desired.

Further, the present invention discloses a cutting machine simple in construction, efficient in operation, and occupying a minimum of floor space when installed.

With the above and other objects in view which will readily appear from the following description, my invention consists of the novel construction, combination and arrangement of parts more fully described in the following specification and set forth in the subjoined claims.

Referring to the drawings, which portray an illustrative form of my invention and wherein similar reference numerals designate similar parts throughout the several views:—

Fig. 4 is a vertical section taken substantially on the line 4—4 of Fig. 3;

Fig. 5 is a detail perspective view of one of the jewel block carrying arms, and Fig. 6 is a similar view illustrating the reverse side thereof.

Figure 1:
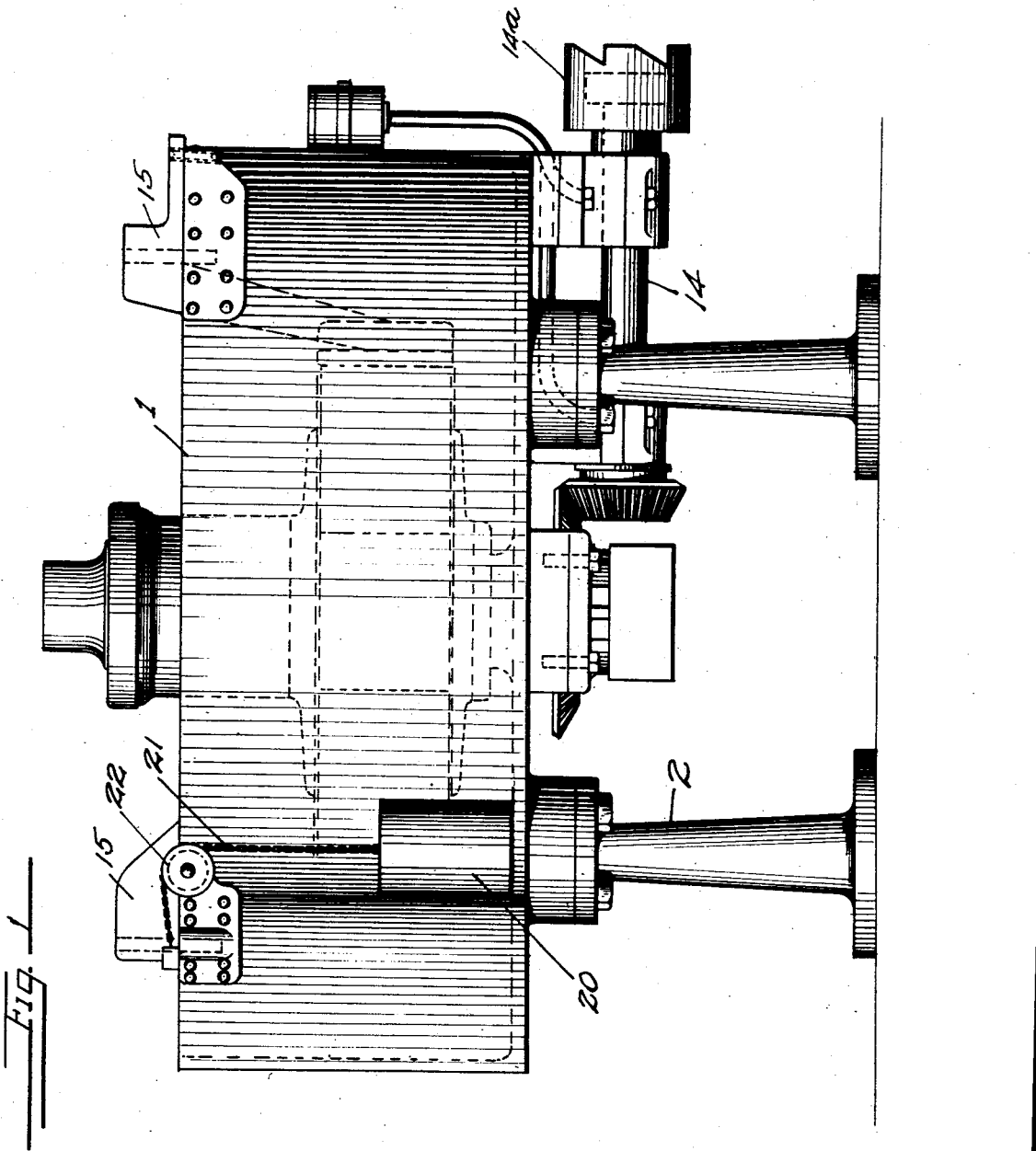
Figure 1 is a side elevation of my improved cutting machine.
Figure 2:
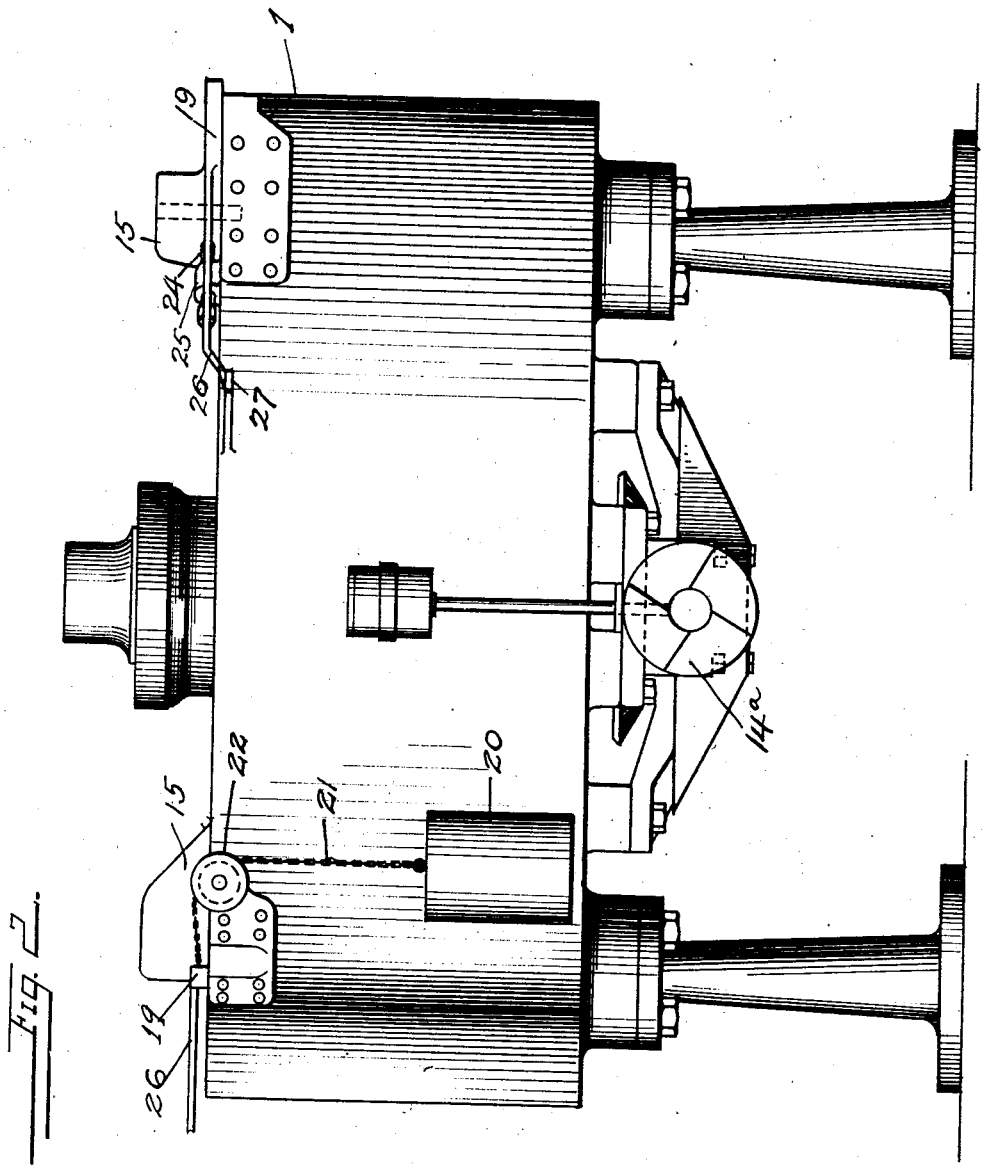
Fig. 2 is a similar view of the machine at right angles to that shown in Fig. 1.

Referring to the illustrated embodiment of my invention, 1 designates a vessel supported upon suitable standards 2 and formed at its center with a vertically-disposed tube or neck 3. A vertical shaft 4 revolubly mounted within the tube 3 is held in spaced relation therewith by means of a suitable packing sleeve 5 and is provided with a collar 6 which supports an arbor 7 extending downwardly over and in spaced relation to the central tube 3 of the containing vessel. At its lower extremity the arbor 7 is formed with a shoulder 8 adapted to support the lower ring 9 upon which rests the lowermost of the cutting blades 10, the cutting blades being arranged in spaced relation one above the other and separated by means of suitable spacing sleeves 11. When a sufficient number of cutting blades has been assembled for a particular operation, an upper clamping sleeve 12 is imposed upon the uppermost of the blades and locked in position by means of a clamping ring 13. The cutting members are preferably formed of thin sheets of comparatively soft metal and revolve with the arbor within the vessel which, during the cutting operation, contains a suitable abrasive compound to a sufficient height to cover the cutting blades and the agate blocks coöperating therewith. A mixture of carborundum and emery powder has been found to be very efficient as an abrasive compound when maintained in a slightly viscous fluid condition, and the soft metal cutting blades 10 carry the minute particles of the abrasive compound upon their peripheries and during the rotation of the blades the agates are gradually cut through the scraping of the abrasive compound against them. Suitable means may be provided for rotating the cutting blades and arbor at any desired speed. As herein shown, the lower end of the vertical shaft 4 is geared with a horizontal drive shaft 14 which may be attached by the clutch pulley 14ª with any desired source of power.

Associated with the plurality of cutting blades are the agate carrying arms 15 which are preferably arranged at predetermined distances around the periphery of the containing vessel, being pivotally supported intermediate their ends so as to allow the agate blocks carried thereby to be gradually moved toward or away from the center of the containing vessel. In the illustrated embodiment my cutting machine employs four of these arms. Each of the agate-carrying arms 15 is constructed substantially as illustrated in Figs. 5 and 6, the inner ends 16 thereof being provided with a plurality of openings 17 adapted to receive retaining screws or bolts, by means of which the agate-carrying blocks are positioned. Owing to this arrangement of the agate-carrying arms, it will be apparent that the agate blocks can be positioned at any desired angle, as, for example, a cut can be made therein and then the block revolved and re-positioned to permit a cut at right angles to the first. To the agate blocks 16 is cemented the rough agate or other stone to be cut, it being possible in my machine to employ blocks of agate of irregular contour. The arms 15 are pivoted intermediate their ends upon upwardly projecting posts 18 carried upon the sides of the containing vessel 1.

Figure 3:
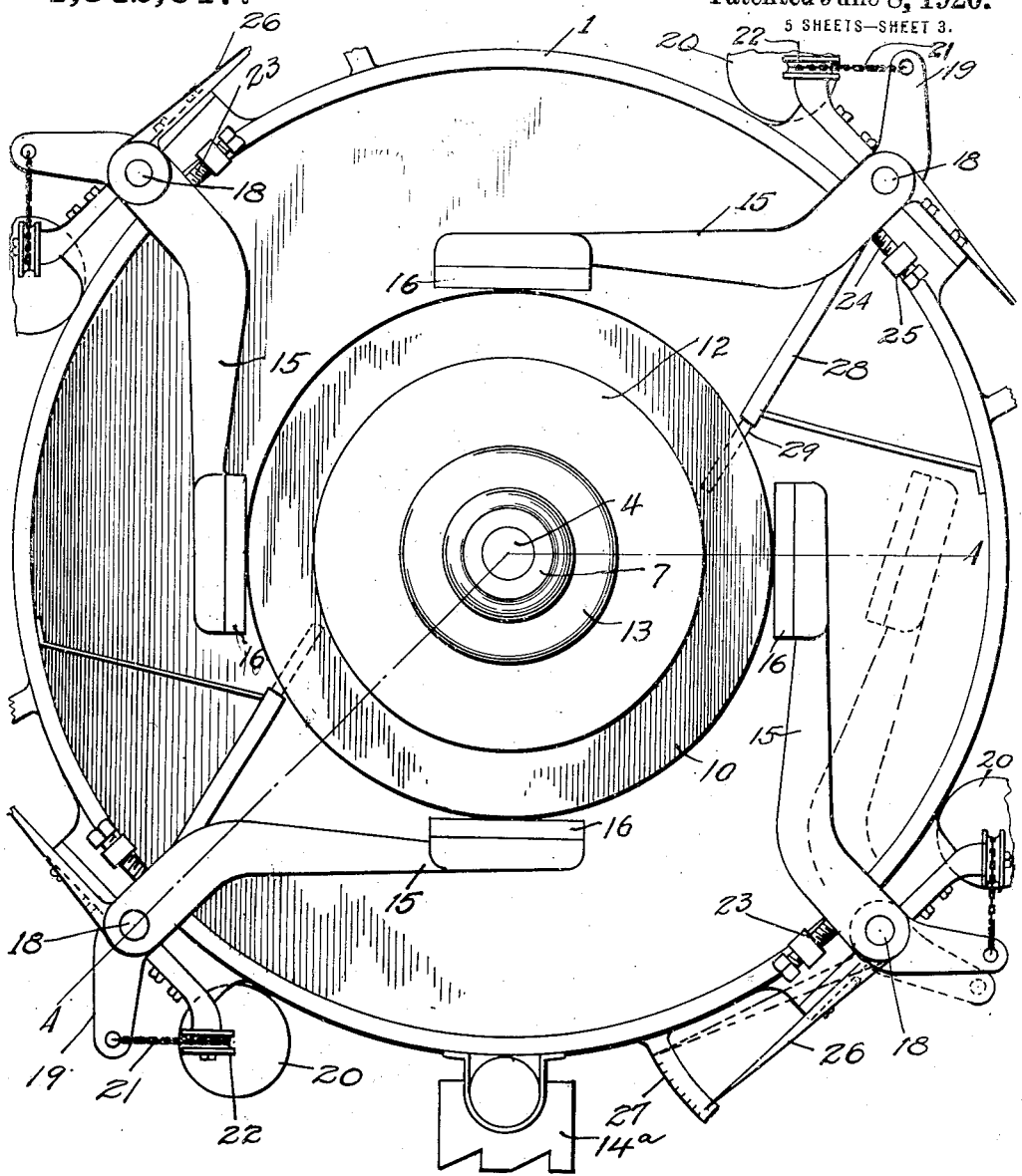
Fig. 3 is a plan view thereof.

To permit the blocks of agate to be normally pressed into contact with the cutting blades 10 and to move them toward the center of the containing vessel in accordance with the depth of the cuts therein, I provide a weight 20 connected with an outwardly-projecting arm 19 of the agate-carrying arms 15 through a chain 21 passing over a pulley 22 suitably mounted upon the side of the containing vessel. Each of the agate-carrying arms 15 is provided with a separate weight 20 and acts independently, thereby enabling the cutting of blocks of agate or the like of radically differing sizes and shapes. Thus, four blocks of agates of different sizes may be cemented upon the agate-carrying arms 15 shown in my illustrated embodiment and the cuts in each of them so regulated that the agate bearings resulting therefrom will be of uniform sizes, though the depth of cut in each of the blocks of agate will be different. To enable the operator to readily ascertain the depth to which the agate is to be cut, and to prevent further cutting after the desired depth has been attained, I provide an adjustable stop 23 for each of the agate-carrying arms 15. These stops preferably comprise screw members 24 suitably threaded in upstanding lugs 25 upon the periphery of the containing vessel 1, any suitable means being provided for locking the stops in position. Coöperating with the adjustable stop means are a plurality of indicators 26 adapted to permit the arrangement of the stop members at the exact position to prevent further cutting of the agates after the desired depth of cut has been reached. Thus the arm can be moved to a position indicating through the pointer 26 the position that it is desired the arm to have when a cut has been made in the agate of the depth desired (as the position shown in full lines in Fig. 3), and the adjustable stop moved to a position contacting the arm at this point. The arm can then be swung outwardly again and the agate block secured thereto, whereupon the weight 20 will force the agate into contact with the cutting blades and continue to press it inwardly until the arm again contacts with the stop member 23. Individual indicators 26 are provided upon each of the agate-carrying arms 15 and comprise a pointer connected with the arm adjacent its pivotal point and moving over a graduated arc 27. By virtue of this construction the depth of cut of each of the agate blocks engaged can be ascertained and the machine will operate until the depth of the cuts has been completely made without cutting the other blocks to a greater depth than that marked by the indicator and the stop set in accordance therewith.

The operation of my cutting machine is as follows: Assuming that it is desired to cut ½ in. cubes of agate or scale pivot bearings, the cutting blades are arranged on the central arbor ½ in. apart to a number sufficient to make the number of cuts desired in the agate blocks. The pointers 26 are then individually set to indicate ½ in. depth on the graduated indicating plates 27, and the adjustable stops 23 turned until they engage the arms in these positions. Blocks of rough agate are then cemented to the agate-carrying blocks or plates 16 and secured by means of retaining bolts to the inner arms 15 and the vessel is filled to a suitable height with the abrasive compound heretofore referred to. The vertical shaft 4 is then rotated at any desired speed, thereby rotating the cutting blades 10 and revolving the abrasive particles of the compound so that they are carried by the peripheries of the soft metal blades against the agate blocks, the agate being gradually cut by the continual rubbing of this abrasive compond thereon against the pressure of the weighted arms 15. As the depth of the cut increases, the weight 20 falls and swings the agate-carrying arms 15 inwardly until when the desired depth of cut has been made, the arm contacts with the adjustable stops 23. When all of the arms have reached the adjustable stops, this cutting operation is finished. The retaining bolts may then be removed and the plates 16 turned so that the cuts in the agate blocks are at right angles to the cutting blades. The operation is then repeated and we have a block of agate cut into squares ½ in. deep. The third cut of this agate whereby the cubes are severed from the original block of agate is preferably performed on a sawing machine not herein disclosed, and the compression of the cubes of agate whereby they are grooved and polished to convert them into finished pivot bearings is preferably performed on special grooving machines disclosed in a companion application.

It often happens during the cutting operation that small pieces of agate are broken off from the block, which, if carried by the revolving cutting blades, would contact with the other agate blocks and mutilate them. To prevent this I provide a plurality of guards 28 (see Figs. 3 and 4), these guards preferably comprising a U-shaped member secured to the inner wall of the containing vessel and carrying a number of radial tines 29 arranged between the cutting blades. These radial tines extend to within a short distance of the spacing sleeves 11 and are sufficiently narrow to prevent their coming into contact with the revolving blades 10.

Having described my invention, I claim:

1. In a machine of the character described, a vessel adapted to contain an abrasive solution, a plurality of spaced rotatable cutting members mounted therein, a plurality of holders for the material to be cut extending within the vessel, and means for moving the holders toward the rotatable members to maintain engagement between the members and material as long as desired.

2. In a machine of the character described, a vessel adapted to contain an abrasive solution, a plurality of spaced rotatable cutting members of soft iron mounted therein, a plurality of holders for the material to be cut mounted upon said vessel, and means for moving the holders toward the rotatable members to maintain engagement between the members and material as long as desired.

3. In a machine of the character described, a vessel adapted to contain an abrasive solution, a plurality of spaced rotatable cutting members mounted therein, a plurality of holders for the material to be cut extending within the vessel, and means for automatically pressing said holders toward the rotatable members until a desired depth of cut is secured.

4. In a machine of the character described, a vessel adapted to contain an abrasive solution, a plurality of cutting disks rotatable in said vessel, a plurality of holding arms mounted upon the vessel and adapted to carry the material to be cut, and means for maintaining the material in engagement with the cutting disks until a desired depth of cut is secured.

5. In a machine of the character described, a vessel adapted to contain an abrasive solution, a plurality of cutting disks of soft iron rotatable in said vessel, a plurality of holding arms mounted upon the vessel and adapted to carry the material to be cut, and gravity actuated means for maintaining the material in engagement with the cutting disks until a desired depth of cut is secured.

6. In a machine of the character described, a vessel adapted to contain an abrasive solution, a plurality of cutting disks in said vessel, means for holding the material to be cut, and means for automatically maintaining said material to be cut in engagement with said cutting disks as long as desired.

7. In a machine of the character described, a vessel adapted to contain an abrasive solution, a plurality of cutting disks in said vessel, means for holding the material to be cut, means for automatically maintaining said material to be cut in engagement with said cutting disks, and means for restraining further engagement of the material and disks after a desired depth of cut has been secured.

8. In a machine of the character described, a vessel adapted to contain an abrasive solution, a plurality of cutting disks in said vessel, means for holding the material to be cut, means for automatically maintaining said material to be cut in engagement with said cutting disks, and an adjustable stop arranged to prevent further engagement of the cutting disks and material when a desired depth of cut has been secured.

9. A cutting machine of the character described, comprising a vessel adapted to contain an abrasive solution, a rotatable cutting member mounted centrally of said vessel, and means supported upon said vessel and adapted to hold the material to be cut in contact with the cutting member.

10. A cutting machine of the character described, comprising a vessel adapted to contain an abrasive solution, a rotatable cutting member mounted centrally of said vessel and comprising a plurality of spaced disks, and means supported upon said vessel and adapted to hold the material to be cut in contact with the cutting disks.

11. A cutting machine of the character described, comprising a vessel adapted to contain an abrasive solution, a rotatable cutting member mounted centrally of said vessel and comprising a plurality of spaced disks, and means pivotally supported upon said vessel and adapted to hold the material to be cut in contact with the cutting disks.

12. A cutting machine of the character described, comprising a vessel adapted to contain an abrasive solution, a rotatable cutting member mounted centrally of said vessel and comprising a plurality of spaced disks, and a plurality of holding arms pivotally supported upon said vessel and adapted to hold the material to be cut in contact with the cutting disks.

13. A cutting machine of the character described, comprising a vessel adapted to contain an abrasive solution, a rotatable cutting member mounted centrally of said vessel and comprising a plurality of spaced disks, a plurality of holding arms pivotally supported upon said vessel and adapted to hold the material to be cut in contact with the cutting disks, and gravity acting means for automatically swinging the holding arms toward the cutting disks.

14. A cutting machine of the character described, comprising a vessel adapted to contain an abrasive solution, a rotatable cutting member mounted centrally of said vessel and comprising a plurality of spaced disks, a plurality of holding arms pivotally supported upon said vessel and adapted to hold the material to be cut in contact with the cutting disks, and automatic means for swinging the holding arms toward the cutting members.

15. A cutting machine of the character described, comprising a vessel adapted to contain an abrasive solution, an arbor rotatably mounted centrally of said vessel, cutting members removably mounted upon said arbor and immersed in the abrasive solution, and means for holding the material to be cut in contact with said cutting members when desired.

16. A cutting machine of the class described, comprising a vessel adapted to contain an abrasive solution, a plurality of rotatable cutting members arranged therein, holding arms arranged on said vessel adjacent to said cutting members, and removable faces on said arms adapted to carry the material to be cut.

17. A cutting machine of the class described, comprising a plurality of rotatable cutting members, holding arms arranged adjacent to said cutting members, removable faces on said arms adapted to carry the material to be cut, and means for removably securing the faces to said arms to permit the angular disposition of the faces relatively to the cutting members.

18. A cutting machine of the class described, comprising a plurality of rotatable cutting members, holding arms arranged adjacent to said cutting members, and removable faces on said arms adapted to carry the material to be cut, said faces being removably secured to said arms and adjustable thereupon to permit the cutting of the material at various angles.

19. A cutting machine of the class described, comprising a vessel, cutting members rotatably mounted within said vessel, means carried upon said vessel for holding the material to be cut in contact with the cutting members, and means carried by said last-named means for permitting the resetting of the material in new positions whereby cuts may be made in the material at various angles.

20. A cutting machine of the class described, comprising a vessel, cutting members rotatably mounted within said vessel, means carried upon said vessel for holding the material to be cut in contact with the cutting members, and means for automatically regulating the depth of cut in the material.

21. A cutting machine of the class described, comprising a vessel, cutting members rotatably mounted within said vessel, means carried upon said vessel for holding the material to be cut in contact with the cutting members, and means for varying and regulating the depth of cut in the material.

22. A cutting machine of the class described, comprising a vessel, cutting members rotatably mounted within said vessel, means carried upon said vessel for holding the material to be cut in contact with the cutting members, and means for varying and regulating the depth of cut in the material, comprising adjustable stops arranged to hold the material away from the cutting members after the desired depth of cut has been secured.

23. A cutting machine of the class described, comprising a vessel, cutting members rotatably mounted within said vessel, means carried upon said vessel for holding the material to be cut in contact with the cutting members, and means for varying and regulating the depth of cut in the material, comprising adjustable stops upon said vessel arranged to hold the material away from the cutting members after the desired depth of cut has been secured.

24. A cutting machine of the class described, comprising a vessel adapted to contain an abrasive solution, an arbor rotatably mounted centrally thereof, a plurality of cutting members mounted upon said arbor and comprising disks of soft metal, means for spacing said disks, and guard members arranged between said disks outwardly of said spacers.

25. A cutting machine of the class described, comprising a vessel adapted to contain an abrasive solution, an arbor rotatably mounted centrally thereof, a plurality of cutting members mounted upon said arbor and comprising disks of soft metal, means for spacing said disks, a plurality of holding arms adapted to press the material to be cut into contact with the cutting disks, and guard members arranged between the holding arms and extending inwardly to positions adjacent the spacers.

ORWELL C. REEVES.

Witnesses:
L. A. CROWLEY,
GEORGE R. FRYE.